(12) United States Patent
Kime

(10) Patent No.: US 7,956,122 B2
(45) Date of Patent: Jun. 7, 2011

(54) VOLATILE ORGANIC COMPOUND (VOC) COMPLIANT SEALING MATERIAL

(75) Inventor: Daniel Kime, Maple Grove, MN (US)

(73) Assignee: Construction Research & Technology GmbH, Trostberg (DE)

( * ) Notice: Subject to any disclaimer, the term of this patent is extended or adjusted under 35 U.S.C. 154(b) by 1385 days.

(21) Appl. No.: 11/150,927

(22) Filed: Jun. 13, 2005

(65) Prior Publication Data

US 2005/0277734 A1 Dec. 15, 2005

Related U.S. Application Data

(60) Provisional application No. 60/579,834, filed on Jun. 15, 2004.

(51) Int. Cl.
*C08G 18/08* (2006.01)
*C08L 75/00* (2006.01)

(52) U.S. Cl. ........................................... 524/589

(58) Field of Classification Search .................. 524/589
See application file for complete search history.

(56) References Cited

U.S. PATENT DOCUMENTS

| | | | |
|---|---|---|---|
| 4,780,521 A | 10/1988 | Duck et al. | |
| 5,115,015 A * | 5/1992 | Richey et al. | 524/507 |
| 5,266,145 A | 11/1993 | Duck et al. | |
| 5,484,849 A * | 1/1996 | Bors et al. | 525/167.5 |
| 5,973,047 A | 10/1999 | Ernst et al. | |
| 5,973,082 A * | 10/1999 | Elmore | 525/530 |
| 6,015,475 A | 1/2000 | Hsieh et al. | |
| 6,337,413 B1 * | 1/2002 | Kapila et al. | 554/163 |
| 6,362,300 B1 | 3/2002 | Araki et al. | |
| 6,433,125 B1 * | 8/2002 | Gruetzmacher et al. | 528/73 |
| 6,512,033 B1 | 1/2003 | Wu | |
| 6,596,808 B1 | 7/2003 | Newberth et al. | |
| 6,649,726 B1 | 11/2003 | Kawanabe et al. | |
| 2001/0031883 A1 * | 10/2001 | Thames et al. | 554/219 |
| 2002/0198312 A1 * | 12/2002 | Kamemura et al. | 524/589 |
| 2003/0096904 A1 | 5/2003 | Hakuta et al. | |
| 2003/0130411 A1 | 7/2003 | Ishikawa et al. | |
| 2003/0139559 A1 | 7/2003 | Okuhira et al. | |
| 2003/0171467 A1 | 9/2003 | Kneafsey et al. | |
| 2003/0176617 A1 | 9/2003 | Shen | |
| 2004/0143031 A1 * | 7/2004 | Sugerman | 523/160 |
| 2004/0161542 A1 * | 8/2004 | Ziemann et al. | 427/385.5 |
| 2005/0250923 A1 * | 11/2005 | Palmese et al. | 526/317.1 |
| 2006/0201388 A1 * | 9/2006 | Sugerman | 106/31.67 |
| 2006/0240194 A1 * | 10/2006 | Lemke | 427/372.2 |

FOREIGN PATENT DOCUMENTS

CA 2 393 667 6/2001

OTHER PUBLICATIONS

Hiroyuki, et al., One-Component Thixotropic Polyurethane Composition, Patent Abstracts of Japan, Jun. 27, 1995, Publication No. 07-166050, Japan.
Canadian Office Action dated Jan. 31, 2011 for Canadian Patent Application No. 2,474,115.

* cited by examiner

*Primary Examiner* — Mark Eashoo
(74) *Attorney, Agent, or Firm* — Curatolo Sidoti Co., LPA; Joseph G. Curatolo; Peter R. Detorre

(57) ABSTRACT

A polyurethane sealant is provided that includes a fatty acid ester that is used to replace volatile solvent in the sealant formulation and a reaction product of polyoxyalkylene polyol and polyisocyanate. The polyurethane sealant produced has a non-volatile materials content of at least 96%. In addition to reducing the volatile organic compounds (voc) content and maintaining the attributes of a sealant, the use of fatty acid esters provides the sealant with superior material extrusion, improved gunning and tooling, and improved package stability. Also provided is a method for making a polyurethane sealant where the polyisocyanate component the polyol component are combined to form a reaction product, and the reaction product is combined with the fatty acid ester component, wherein the polyurethane sealant has a non-volatile materials content of at least 96%.

24 Claims, No Drawings

VOLATILE ORGANIC COMPOUND (VOC) COMPLIANT SEALING MATERIAL

CROSS REFERENCE TO RELATED APPLICATIONS

This application claims the benefit of the filing date of U.S. Provisional Application for Patent Ser. No. 60/579,834 filed Jun. 15, 2004.

BACKGROUND

Sealants are used to isolate an environment, serving as a barrier to the passage of gases, liquids, and solid particles. Sealants also serve to attenuate mechanical shock, vibration, and sound, maintain a pressure differential, and protect items mechanically, electrically, and thermally.

The largest use of sealants is in commercial and home construction and repair, and in the transportation market. Exterior commercial construction sealants must accommodate large changes in joint gap or width from temperature cycling and wind loads. In addition, the sealants must resist rain, heat, ultraviolet light, oxygen, and ozone. Building materials such as concrete, stone, marble, aluminum, steel, glass, and plastics differ widely in thermal coefficients of expansion, so joint design is very important for sections of different materials that are fitted together. The gap width between sections is based on material type and length of section, with a wider gap for larger sections. Sealants are also commonly used for expansion joints in parking decks.

Polyurethanes have suitable properties for many useful products, including elastomeric sealants prepared from the reaction of hydroxy-functional components with isocyanate-functional components. Polyurethanes have utility as high performance sealants which are suitable for commercial building and construction for interior and exterior sealing. High performance sealants can typically accommodate significant joint movement in compression or tension with good recovery.

Single-part polyurethane sealants typically are produced by reacting a polyol with a polyisocyanate, with or without a catalyst, in a reactor for up to eight hours to produce an isocyanate-terminated prepolymer. Various additives are blended with the prepolymer to provide a product having the desired characteristics and the resulting product is packaged in substantially hermetically sealed containers for use.

Regulatory requirements require reduction in the volatile organic compounds (voc) content of sealing materials such as joint sealants. To meet these ever-increasingly stringent standards, volatile solvent content must be reduced. However, volatile solvents serve useful purposes in sealing materials such as viscosity reduction, improvement of handling, and ensuring quick tack-free drying times.

Therefore a material is needed to replace volatile solvents so as to reduce volatile organic compounds (voc) in sealing materials without affecting the processability, handling, and package stability. What is also needed are low volatile organic compounds materials that have little color or smell and do not affect the long term package stability.

SUMMARY

A polyurethane sealant is provided that comprises a fatty acid ester and a reaction product of polyoxyalkylene polyol and polyisocyanate, and wherein the polyurethane sealant has a non-volatile materials content of at least 96%.

A method for making a polyurethane sealant is provided that comprises providing a polyisocyanate component, a polyoxyalkylene polyol component, and a fatty acid ester component; combining the polyisocyanate component and the polyoxyalkylene polyol component to form a reaction product, and combining the reaction product and fatty acid ester component; wherein the polyurethane sealant has a non-volatile materials content of at least 96%.

DETAILED DESCRIPTION

A polyurethane sealant is provided that uses fatty acid esters to replace volatile solvents in the formulation. The fatty acid esters are non-reactive materials, i.e this non-reactivity is useful as these materials can be used to substantially replace volatile solvents in sealing materials, primarily polyurethane sealants. In addition to maintaining the attributes of a sealant, the use of fatty acid esters provides the sealant with superior material extrusion, improved gunning and tooling, and improved package stability. The replacement of volatile solvents with fatty acid esters in polyurethane sealants also reduces the volatile organic compounds (voc) content, resulting in sealants wherein the non-volatile materials (nvm) is at least 96%. The low volatile organic compounds such as fatty acid esters used in the sealant also have little color or smell, and do not affect the long term package stability.

In one embodiment, the fatty acid esters used in the polyurethane sealant comprise about $C_{14}$ to about $C_{24}$ fatty acid esters with ethanol and methanol, such as methyl oleate methyl stearate, methyl myristate, methyl palmitate, methyl linoleate, ethyl oleate, ethyl stearate, ethyl myristate, ethyl palmitate and ethyl linoleate. It should be understood that the use of fatty acid esters can be extended to other sealing materials.

The polyoxyalkylene polyol of the polyurethane sealant may comprise a diol, a triol or higher functionality polyol, and may be selected from the group consisting of polyether polyols, polyester polyols, and combinations thereof.

For illustration purposes but not by way of limitation, the polyoxyalkylene polyol may be selected from the group consisting of polyethylene glycols polypropylene glycols, polytetramethylene glycols, polycaprolactone diols and triols, and combinations thereof.

Polyoxyalkylene polyols include polyether polyols prepared by the copolymerization of cyclic ethers selected from the group consisting of ethylene oxide, propylene oxide, trimethylene oxide, tetrahydrofuran, and mixtures of these cyclic ethers, with aliphatic polyols selected from the group consisting of ethylene glycol, 1,3-butanediol, diethylene glycol, dipropylene glycol, 1,2-propylene glycol, 1,3-propylene glycol, 1,4-butylene glycol, and mixtures of these aliphatic polyols.

Representative examples of polyoxyalkylene polyols include Voranol™ 220-028 and Voranol™ 220-056N (available from Dow Chemical Company, Midland, Mich.) as well as Acclaim™ 4200, Acclaim™ 6300, Acclaim™ 8200 and Acclaim™ 12200 (available from Bayer Corporation, Pittsburgh, Pa.).

In certain embodiments, the polyoxyalkylene polyol of the polyurethane sealant may have a molecular weight in the range of about 500 to about 20,000. In other embodiments, the polyol may have a molecular weight in the range of about 4,000 to about 12,000. In another embodiment, the polyol may comprise a polypropylene glycol with a number average molecular weight in the range of about 4,000 to about 12,000, and the polypropylene glycol may have a degree of unsaturation of less than about 0.04 meq/g. The molecular weight is either a calculated molecular weight, i.e. the sum of the atomic weights of the atoms making up the material, or the molecular weight is a number average molecular weight determined based on end group analysis or measurement of colligative properties by ebulliometry, cryoscopy, or membrane osmometry.

The polyoxyalkylene polyol is reacted with an excess of polyisocyanate to produce a reaction product containing an isocyanate-terminated polyurethane prepolymer and unreacted isocyanate. The amount of polyisocyanate used is sufficient to provide a ratio of isocyanate equivalence to polyol equivalence of about 1.1:1 to about 15:1, in another embodiment, about 1.2:1 to about 10:1 The particular ratio used depends primarily on the desired flexibility characteristics of the sealant, with flexibility decreasing as this ratio increases.

In one embodiment the polyisocyanates may comprise aromatic isocyanates such as methylene diphenyl diisocyanates (MDI), toluene diisocyanates (TDI), polymeric methylene diphenyl diisocyanate (PMDI), p-phenyl diisocyanate (PDI), naphthalene diisocyanate (NDI), aliphatic isocyanates such as hexamethylene diisocyanates (HDI), hexamethylene diisocyanate trimers (HDI Trimers), dicyclohexylmethane diisocyanates ($H_{12}$MDI), isophorone diisocyanates (IPDI), cyclohexane diisocyanate (CHDI), tetramethylxylylene diisocyanate (TMXDI).

In another embodiment suitable polyisocyanates may include diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate; triisocyanates such as 4,4',4''-triphenylmethane triisocyanate, polymethylene polyphenylisocyanate and toluene, 2,4,6-triisocyanate; and tetraisocyanates, such as 4,4'-dimethyldiphenylmethane-2,2'-5,5'-tetraisocyanate.

In certain embodiments the free % NCO (NCO-content) isocyanate may be 1% to 12% by weight of the reaction product. In another embodiment the isocyanate may be about 2% to 6% free NCO by weight of the reaction product.

The free % NCO is defined as the weight percent of a substance that is available for reaction, either as free isocyanate monomer or as unreacted isocyanate (NCO-groups) in a polymer, prepolymer, or quasi-prepolymer. This concept is known those skilled in the art.

The polyurethane sealant may comprise additional components which may include but are not limited to thixotropic agents, fillers, plasticizers, antioxidants, UV stabilizers, fungicides, mildewcides, biocides, fire retardants, coloring agents, surface additives, adhesion promoters, rheology modifiers, catalysts, defoaming agents, solvents, drying agents and the like.

In one embodiment the total amount of such additives can be about 10 to about 50 weight percent; and in some embodiments about 25 to about 40 weight percent, based on the total weight of the sealant.

Various fillers can be used in the polyurethane sealant, including talc, ground calcium carbonate, precipitated calcium carbonate, asbestos, carbon black, titanium dioxide, glass, such as crushed glass or glass spheres, metal such as iron particles, quartz, silica such as hydrophilic silica, hydrophobic amorphous fumed silica, and amorphous precipitated silica, barytes, acrylates, limestone, sulfates, alumina, various clays, diatomaceous earth, wollastonite, mica, perlite, flint powder, kryolite, alumina trihydrate, polymer granules and powders such as granulated or micronized polyethylene and granulated or micronized polypropylene, melamine, fibers such as polypropylene or nylon, zinc oxide, and mixtures thereof. Carbon black and titanium dioxide may be used as both a filler and a pigment.

The polyurethane sealant may also comprise a rheology modifier to increase the viscosity of the material immediately after application to a substrate. This can prevent the sealant from dripping or running when initially applied to a substrate. Examples of the rheology modifier include, but are not limited to, fumed silica, polyamide waxes, modified castor oil, and clay intercalated with organic cations, acrylates, PVC plastisols, polyurea-plasticizer dispersions. Talc may be used as both a filler and rheology modifier.

Various plasticizers which are noncombustible, have a relatively low viscosity and are compatible with the urethane matrix can be used in the polyurethane sealant. While not required, a solvent can be used to aid processing and/or as a diluent. In some embodiments the plasticizer can function both as a plasticizer and a solvent. Plasticizers such as nonvolatile organic liquids and low-melting solids, such as hydrogenated petroleum distillates, coal tar distillates, and other organic liquids having a boiling point higher than 30° C., phthalates (for example, diisodecyl phthalate and dioctyl phthalate) and adipates (for example, 2-ethyl hexyl adipate) can be used. Other materials conventionally used as a plasticizer and/or solvent in polyurethane sealant formulations, such as methylene chloride, naphthol spirits, xylene and mixed spirits, can also be used. If used, in one embodiment the amount of plasticizer(solvent) may be up to about 4 weight percent.

An antioxidant can be added to the polyurethane sealant to improve the long-term oxidation resistance of the sealant. Antioxidants may comprise alkylated monophenols, alkylthiomethylphenols, hydroquinones and alkylated hydroquinones, tocopherols, hydroxylated thiodiphenyl ethers, alkylidenebisphenols, O—, N— and S-benzyl compounds, hydroxybenzylated malonates, aromatic hydroxybenzyl compounds, triazine compounds, benzylphosphonates, acylaminophenols, esters of beta-(3,5-di-tert-butyl-4-hydroxyphenyl)propionic acid with mono- or polyhydric alcohols, esters of beta-(5-tert-butyl-4-hydroxy-3-methylphenyl)propionic acid with mono- or polyhydric alcohols, esters of beta-(3,5-dicyclohexyl-4-hydroxyphenyl)propionic acid with mono- or polyhydric alcohols, esters of 3,5-di-tert-butyl-4-hydroxyphenyl acetic acid with mono- or polyhydric alcohols, amides of beta-(3,5-di-tert-butyl-4-hydroxyphenyl) propionic acid, ascorbic acid and derivatives, aminic antioxidants, and mixtures thereof. If used, the amount of antioxidant in one embodiment can be about 0.3 to about 1.0 weight percent, based on the total weight of the sealant. Various commercially available antioxidants can be used, such as IRGANOX1076, an octadecyl 3,5-di-tert-butyl 4 hydroxyhydrocinnamate marketed by Ciba Corporation.

If included in the polyurethane sealant formulation, UV stabilizers may comprise 2-(2'-hydroxyphenyl)benzotriazoles, 2-hydroxybenzophenones, esters of substituted and unsubstituted benzoic acids, acrylates, nickel compounds, sterically hindered amines, oxanilides, 2-(2-hydroxyphenyl)-1,3,5-triazines, and mixtures thereof.

Fungicides, mildewcides, and biocides if used in the polyurethane sealant may comprise 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, copper 8-quinolinate, and mixtures thereof.

Fire retardants, if used in the polyurethane sealant, may comprise any material that provides self extinguishing properties. Examples of the fire retardant include, but are not limited to, phosphates such as triphenyl phosphate, polyammonium phosphate, monoammonium phosphate, or tri(2-chloroethyl) phosphate, exfoliated graphite, acid treated natural graphite flakes, and mixtures thereof. The fire retardant can be a liquid or a solid. A solid fire retardant may be ground to a micron size, typically referred to by those skilled in the art as micronized. Additionally, the fire retardant may include but is not limited to self extinguishing agents and flame retardants. In one embodiment, the fire retardant may be polyammonium phosphate. In another embodiment, aluminum oxide smoke retardant may be used in combination with polyammonium phosphate.

The polyurethane sealant may also comprise a coloring agent, such as a pigment or a dye, to provide a desired color to the sealant. Examples of coloring agents are carbon black and titanium dioxide which may be in the rutile form, but other coloring agents are also useful. Carbon black and titanium dioxide may act as both pigments and fillers in the sealant. Additional examples of pigments include, but are not limited to, barium sulfate, zinc oxide, zinc sulfide, basic lead carbonate, antimony trioxide, lithopones (zinc sulfide and barium sulfate), inorganic color pigments such as iron oxides, carbon black, graphite, luminescent pigments, zinc yellow, zinc green, ultramarine, manganese black, antimony black, manganese violet, Paris blue, and Schweinfurter green, organic color pigments such as sepia, gamboge, Cassel brown, toluidine red, para red, Hansa yellow, indigo, azo dyes, anthraquinonoid and indigoid dyes, as well as dioxazine, quinacridone, phthalocyanine, isoindolinone, and metal complex pigments, and mixtures thereof.

The polyurethane sealant may additionally comprise surface additives such as flow and leveling additives, wetting agents, and antifoaming agents to facilitate application of the material. Examples of flow and leveling additives, wetting agents, and antifoaming agents include silicones, modified silicones, polyacrylates, and hydrocarbons such as petroleum components and mixtures. Examples of suitable flow additives include, but are not limited to, polyester modified acrylic functional poly-di-methyl siloxanes such as BYK®-371, BYK® P-104, and polyacrylate copolymers such as BYK®-358, (alll available from BYK-Chemie USA, Wallingford, Conn.), and fluorosurfactants such as 3M™ FLUORAD™ FC-4430 Fluorosurfactant (available from 3M Company, St. Paul, Minn.).

Adhesion promoters can also be used in the polyurethane sealant. Examples of adhesion promoters include, but are not limited to 2-aminoethyl-dimethylmethoxysilane; 6-amino-hexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane and 3-aminopropyl-triisopropoxysilane, γ-glycidoxypropyltrimethoxysilane, γ-glycidoxypropyltriethoxysilane, γ-mercaptopropyltrimethoxysilane, γ-mercaptopropyltriethoxysilane, and, γ-ureidopropyltrimethoxysilane, and γ-ureidopropyltriethoxysilane.

One or more conventional catalysts which accelerate the isocyanate-polyol reaction can be used, including tertiary amines, organo metallic compounds and mixtures thereof. Tertiary amines such as triethylenediamine, dimethylethanolamine, triethanolamine, N-ethyl morpholine, N-methyldicyclohexylamine, N,N-dimethyl cycolhexylamine, N,N,N', N'-tetramethyl-1,3-butanediamine, ether and the like can be used.

Organo metallic compounds such as tin compounds such as stannous octoate, stannous chloride, dibutyltin dilaurate, dibutyltin diacetate, dibutyltin-di-2 ethyl hexoate and the like. Other suitable organo metallic compounds include bismuth octoate, zinc octoate and the like can be used.

The amount of catalysts, if used, may be in one embodiment about 0.01 to about 1 weight percent and in another embodiment about 0.05 to about 0.3, weight percent, based on the total weight of the sealant. A complexing agent which reacts with the catalyst to slow down its reactivity after the sealant has been packaged can be used in one embodiment, such as diethyl malonate. When used, the amount of the complexing agent in one embodiment usually is about 0.05 to about 1 weight percent, and in another embodiment about 0.1 to about 0.5 weight percent, based on the total weight of the sealant.

Polyurethane sealants may be one component, two component or multi-component. In certain embodiments single part polyurethane sealants may be sealing materials that can be applied as supplied, that is, there is no mixing required prior to application. In other embodiments multi-part polyurethane (two or more parts) sealants differ from single part polyurethane sealants in that two or more parts must be mixed prior to application of the sealant. The differences between single part and multi-part polyurethane sealants are known to those skilled in the art.

In one process for producing a sealant, the polyisocyanate is introduced into a covered mixing vessel or tank and the polyol is added to the polyisocyanate with mixing under an atmosphere of dry gas, such as nitrogen. The complexing agent (diethyl malonate), inhibitor (phosphoric acid), catalyst and antioxidant are added with mixing under a dry nitrogen blanket and the resulting mixture is mixed for approximately about 1.5 to about 2 hours to form a reaction mixture containing an isocyanate-terminated prepolymer and unreacted isocyanate.

The performance capabilities of the sealant can be expressed in terms of measured physical properties such as tensile strength, elongation percentage, and tensile stress at 100 percent elongation, often referred to as 100 percent modulus, measured by a standard test method such as ASTM D 412. Tensile strength is the force, measured in units such as pounds per square inch or psi, needed to stretch a material until it breaks. Elongation percentage or elongation at break is how much the material stretches before it breaks, as a percentage of its original dimensions. The 100 percent modulus is the force needed to stretch the material to twice its original dimensions.

In certain embodiments, a polyurethane sealant is provided, wherein the sealant may have a 100 percent modulus of less than about 100 psi. In other embodiments, the polyurethane sealant may have a 100 percent modulus of about 20 psi to about 95 psi. In yet other embodiments, the polyurethane sealant may have a 100 percent modulus of about 40 psi to about 90 psi.

In certain embodiments, the polyurethane sealant may have a tensile strength of about 90 psi or greater. In other embodiments, the polyurethane sealant may have a tensile strength of about 100 psi or greater. In yet other embodiments, the polyurethane sealant may have a tensile strength of about 110 psi or greater.

In certain embodiments, the polyurethane sealant may have an elongation at break of about 200 percent or greater. In other embodiments, the polyurethane sealant may have an elongation of about 240 percent or greater. In yet other embodiments, the polyurethane sealant may have an elongation of about 280 percent or greater.

Improved performance is typically obtained for clean and dry substrate surfaces. Surface preparation before sealant application can include water-blasting, sandblasting, cleaning, and drying of concrete surfaces, cleaning of metal surfaces with organic solvents, scuff-sanding and organic solvent wiping of composite surfaces, flame-etching of plastic surfaces, and the like.

A formulation of a single-part, low VOC ambient moisture-curing polyurethane sealant is listed in Table 1 below:

TABLE 1

| COMPONENT | % of Total Sealant Weight |
|---|---|
| Polyether Polyol | 45-60 |
| Flow Additive | 0-1 |
| Pigment | 0-8 |
| Drying Agent | 1-5 |
| Talc | 0-5 |
| UV Stabilizer | 0-.5 |
| Thixotropic Agent | 1-26 |
| Catalyst | 0-1 |
| Blocker | 0-1 |
| Solvent | 0-4 |
| Toluene Diisocyanate | 2-6 |
| Antioxidant | 0-1 |
| Adhesion Promoter | 0-1.5 |
| Latent Hardener | 0-4 |
| Methyl Oleate | 1-8 |

TESTS FOR PACKAGE STABILITY

To test solvent replacement, heat aging was used as a method to estimate the long-term package stability of the finished sealant formulation.

In the prior art, replacement of volatile solvents involved the use of higher molecular weight hydrocarbons that have boiling points higher than conventional solvents used in sealing material. Candidates of different chemical classes with voc compliant boiling point were evaluated using the seven-day oven test for their ability to meet volatile organic compounds (VOC) regulations. The samples tested comprised the same mixture as in Table 1 but with the fatty acid ester (methyl oleate in Table 1) replaced with one of the following chemical components. Cartridges containing the sealant samples were prepared and placed in a 140° F. oven for seven days. At the end of the seven days the cartridges were removed from the oven and allowed to cool to room temperature. After cooling the sealant samples were extruded from the cartridge and visually examined for evidence of separation and measured for a Brookfield viscosity of less than 16,000 poise at 75° F.

TABLE 2

| Sealant Sample | Chemical Component | Results (poise/seperation) |
|---|---|---|
| S-1 | aliphatic hydrocarbon | separated |
| S-2 | Aromatic Hydrocarbon | 34,000/separated |
| S-3 | petroleum napthas/petroleum distillate | 15,300/separated |
| S-4 | aliphatic glycidyl ether | 24,000 |
| S-5 | propylene carbonate | 25,600 |
| S-6 | methyl oleate | 14,500 |

After testing it was determined that none of the tested chemical components except for fatty acid esters represented by (methyl oleate) provided sufficient package stability for the finished product. All of the sealant samples tested with the exception of the fatty acid esters showed separation and/or decreased thixotropy. During testing it was also shown that that long chain hydrocarbons would separate in the formulations.

The results demonstrated that replacement or at least partial replacement of volatile solvents with fatty acid ester types of diluents such as methyl oleate provided the finished sealant formulation with the necessary package stability as determined by oven aging. In addition to good package stability, it was also discovered that the sealant formulations had better gunning and tooling than prior art sealant formulations that contain only volatile solvents.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

I claim:

1. A polyurethane sealant comprising the components:
   a. a non-reactive fatty acid ester;
   b. a reaction product of polyoxyalkylene polyol and polyisocyanate; and,
   c. a thixotropic agent;
wherein the polyurethane sealant has a non-volatile materials content of at least 96%, is capable of extruding, gunning, and tooling and wherein the polyurethane sealant has a Brookfield viscosity of less than 16,000 poise at 75° F. without separation of the components after such gunning, tooling or extruding and wherein the polyurethane sealant exhibits improved package stability.

2. The polyurethane sealant of claim 1 wherein the sealant is further characterized in that it is at least one of a single part polyurethane sealant or a multi-part polyurethane sealant.

3. The polyurethane sealant of claim 1 wherein the non-reactive fatty acid ester comprises about $C_{14}$ to about $C_{24}$ fatty acid esters.

4. The polyurethane sealant of claim 1 wherein the non-reactive fatty acid ester comprises at least one of methyl fatty acid ester or ethyl fatty acid ester.

5. The polyurethane sealant of claim 1 wherein the non-reactive fatty acid ester comprises at least one of methyl oleate, methyl stearate, methyl myristate, methyl palmitate, methyl linoleate, ethyl oleate, ethyl stearate, ethyl myristate, ethyl palmitate, ethyl linoleate or mixtures thereof.

6. The polyurethane sealant of claim 1 wherein the polyoxyalkylene polyol comprises a diol, a triol or higher functionality polyol.

7. The polyurethane sealant of claim 1 wherein the polyoxyalkylene polyol is at least one of polyether polyols, polyester polyols, or combinations thereof.

8. The polyurethane sealant of claim 1 wherein the polyoxyalkylene polyol is at least one of polypropylene glycols, polyethylene glycols, polytetramethylene glycols, polycaprolactone diols, polycaprolactone triols, or combinations thereof.

9. The polyurethane sealant of claim 1 wherein the molecular weight of the polyoxyalkylene polyol is about 500 to about 20,000.

10. The polyurethane sealant of claim 1 wherein the polyisocyanate comprises at least one of methylene diphenyl diisocyanates, toluene diisocyanates, polymeric methylene diphenyl diisocyanate, p-phenyl diisocyanate, naphthalene diisocyanate, hexamethylene diisocyanates, hexamethylene diisocyanate trimers, dicyclohexylmethane diisocyanates, isophorone diisocyanates, coclohexane diisocyanate, tetramethylxylylene diisocyanate, or mixtures thereof.

11. The polyurethane sealant of claim 1 wherein the ratio of polyisocyanate equivalents to polyol equivalents is about 1.1:1 to about 15:1.

12. The polyurethane sealant of claim 1 wherein the free % NCO polyisocyanate is about 1% to about 12% by weight of the reaction product.

13. The polyurethane sealant of claim 1 wherein the polyurethane sealant additionally comprises at least one of fillers, plasticizers, antioxidants, UV stabilizers, fungicides, mildewcides, biocides, fire retardants, coloring agents, surface additives, adhesion promoters, rheology modifiers, catalysts, defoaming agents, solvents, drying agents, complexing agents or mixtures thereof.

14. A method for making a polyurethane sealant comprising:
 a) providing a polyisocyanate component, a polyoxyalkylene polyol component, a thixotropic agent and a non-reactive fatty acid ester component;
 b) combining the polyisocyanate component and the polyoxyalkylene polyol component to form a reaction product, and
 c) combining the reaction product with the thixotropic agent and the non-reactive fatty acid ester component;
wherein the polyurethane sealant has a non-volatile materials content of at least 96%, is capable of extruding, gunning, and tooling and wherein the polyurethane sealant has a Brookfield viscosity of less than 16,000 poise at 75° F. without separation of the components after such gunning, tooling or extruding and wherein the polyurethane sealant exhibits improved package stability.

15. The method of claim 14 wherein the non-reactive fatty acid ester comprises about $C_{14}$ to about $C_{24}$ fatty acid esters.

16. The method of claim 14 wherein the non-reactive fatty acid ester comprises at least one of methyl fatty acid ester or ethyl fatty acid ester.

17. The method of claim 14 wherein the non-reactive fatty acid ester comprises at least one of methyl oleate or ethyl oleate.

18. The method of claim 14 wherein the polyoxyalkylene polyol comprises a diol or higher functionality polyol.

19. The method of claim 14 wherein the polyoxyalkylene polyol is at least one of polyether polyols, polyester polyols, or combinations thereof.

20. The method of claim 14 wherein the polyoxyalkylene polyol is at least one of polypropylene glycols, polyethylene glycols, polytetramethylene glycols, polycaprolactone diols, polycaprolactone triols, or combinations thereof.

21. The method of claim 14 wherein the molecular weight of the polyoxyalkylene polyol is about 500 to about 12,000.

22. The method of claim 14 wherein the polyisocyanate comprises at least one of methylene diphenyl diisocyanates, toluene diisocyanates, polymeric methylene diphenyl diisocyanate, p-phenyl diisocyanate, naphthalene diisocyanate, hexamethylene diisocyanates, hexamethylene diisocyanate trimers, dicyclohexylmethane diisocyanates, isophorone diisocyanates, cyclohexane diisocyanate, tetramethylxylylene diisocyanate, or mixtures thereof.

23. The method of claim 14 wherein the ratio of polyisocyanate equivalents to polyol equivalents is about 1.1:1 to about 15:1.

24. The method of claim 14 wherein the polyurethane sealant additionally comprises at least one of fillers, plasticizers, antioxidants, UV stabilizers, fungicides, mildewcides, biocides, fire retardants, coloring agents, surface additives, adhesion promoters, rheology modifiers, catalysts, defoaming agents, solvents, drying agents, complexing agents or mixtures thereof.

* * * * *